Mar. 13, 1923.
L. E. DE MOLE
DIFFERENTIAL OR BALANCE GEAR
Filed July 14, 1920
1,448,056
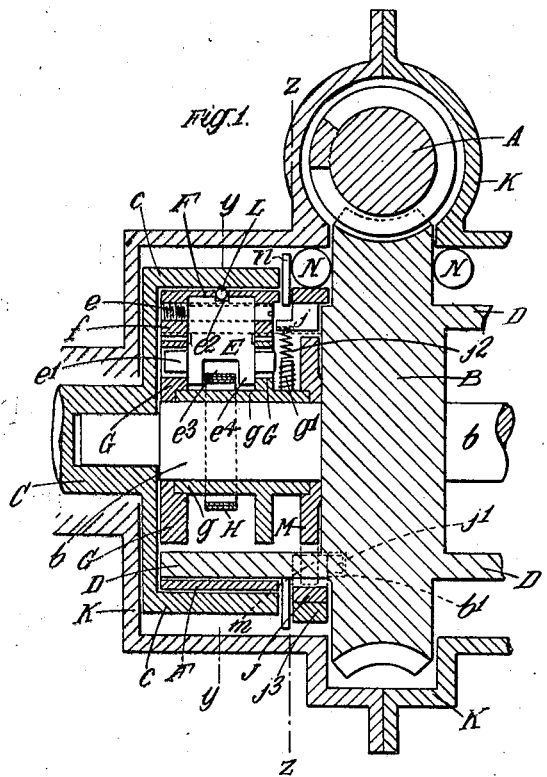
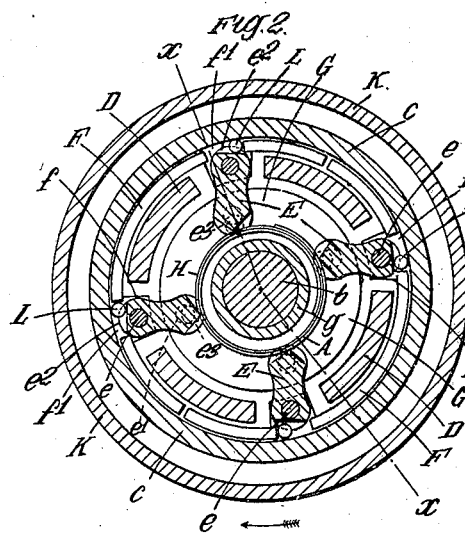
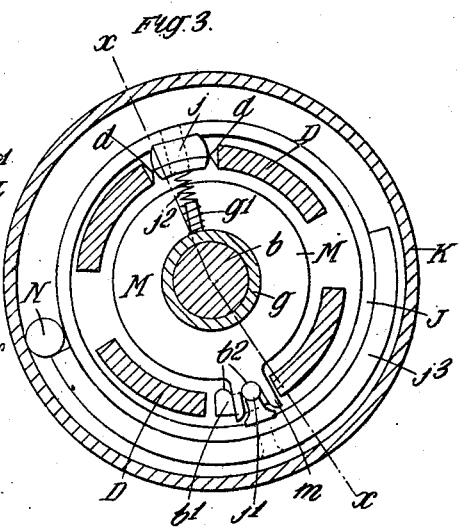
Inventor:
Lancelot Eldin de Mole
by Cushman Bryant & Darby
attys.

Patented Mar. 13, 1923.

1,448,056

UNITED STATES PATENT OFFICE.

LANCELOT ELDIN DE MOLE, OF SYDNEY, NEW SOUTH WALES, AUSTRALIA.

DIFFERENTIAL OR BALANCE GEAR.

Application filed July 14, 1920. Serial No. 396,282.

*To all whom it may concern:*

Be it known that I, LANCELOT ELDIN DE MOLE, a subject of the King of Great Britain, residing at Ercildoune, Brierley Street, Cremorne, Sydney, New South Wales, Australia, have invented certain new and useful Improvements in Differential or Balance Gear, of which the following is a specification.

This invention relates to reversible clutch mechanism especially intended for use with differential or balance gear such as may be used, for example, on motor vehicles for transmitting the drive from the engine to the driving wheels.

According to this invention the clutch comprises a set of toggle members adapted to take up either one of two positions in which they bring the clutch into operation under spring control, the toggle members being automatically displaced from one operative position to the other upon reversal of the drive and freeing the driven member from the clutch when such member tends to move faster than the drive.

In a convenient construction embodying this invention as applied to a differential gear especially adapted for motor vehicles, a worm wheel driven from a worm on an engine driven shaft carries upon each face a set of dogs or stops arranged cylindrically. Between the adjacent dogs are mounted the toggle members, supported at their outer ends on pivots carried by inwardly projecting lugs on an expanding divided clutch ring, the ring being preferably made in two semi-circular members adapted to expand against a casing on the end of the live axle, the inner ends of the toggles having pins engaging in short radial slots in a ring or frame mounted on a sleeve carried by the spindle of the worm wheel. The outer ends of the toggles are formed with a channel at right angles to the toggle axis, receiving small toggle actuating balls, and their inner ends are of wedge formation and bear against a central coiled spring of clockspring type around which the toggles are symmetrically placed so that the single spring acts equally against all the toggles.

For reversing purposes the member engaging the toggle pins is adapted to be turned through a small angle in either direction by a reversing lever made conveniently in the form of a ring mounted on a sliding fulcrum at one side and reversing by means of a large ball lying between the ring and a fixed outer casing and adapted to meet either end of a semi-circular rib or flange on the reversing ring, the arrangement being such that in the driving position the reversing ring lever is eccentric and the ball lies in the space between the ring and the casing, where it is free. On the engine reversing the ball rolls into the tapering channel between the ring and the casing and moves the ring inwards, first releasing it from a catch which holds it in one or other of its normal positions and on continued movement turning the ring around its fulcrum at one side so as to displace it to the other side of the centre, when the ball lies against the other end of the semi-circular flange and is carried round with it. In this position of the mechanism the toggles are all displaced to the second operative position through a connection from the reversing lever to the frame receiving the toggle pins, and the dogs act upon the opposite side of the lugs carrying the toggles, which are therefore again brought into their radial position and drive the expanding clutch ring against its casing.

In order that the said invention may be clearly understood and readily carried into effect the same will now be described more fully with reference to the accompanying drawings in which:—

Figure 1 is a section through the axis of the clutch and gear taken on the section line $x$—$x$ of Figure 2, and Figures 2 and 3 are cross sections taken respectively on the lines $y$—$y$ and $z$—$z$ of Figure 1.

A is an engine driven worm shaft. B is the worm wheel driven by the worm A and mounted on the axle $b$. C is the driven axle or live axle of the vehicle, terminating in the casing $c$. D, D are dogs, or stops, four in number, projecting in cylindrical form from the face of the wheel B. E, E are the toggle members. F is the clutch ring divided diametrically into two segments and having four inwardly projecting lugs $f$ carrying the outer ends of the toggles E through the pivot pins $e$. G is the annular frame mounted on the sleeve $g$ turning on the axle $b$ of the wheel B and receiving the pins $e'$ towards the inner ends of the toggles E. H is the concentric clock-spring against which the inner ends of the toggles are adapted to bear. J is the annular reversing lever provided with a rounded pivot member $j$ adapted to slide between guides $d$ belonging to a pair of the dogs D so that the annular lever can be swung to one side or another of its central position. K is the fixed external casing enclosing the gear and clutch.

The expanding clutch ring F is brought into action against the inner face of the casing $c$ on the driven axle C when the worm wheel B and its dogs D are turned, by the aid of the small balls L which lie in recesses $f'$ in the ring F, these recesses being immediately over the centre of the corresponding toggles, which are grooved at $e^2$ so that when the toggle is at an angle to the radius from the centre of the clutch, as shown in Figure 2, the flat bottoms of the grooves $e^2$ are tilted to form a wedge shaped recess for the balls. Any relative movement between the clutch ring F and the casing $c$ in one direction is freely allowed but a relative movement in the other direction causes the balls to ride up the grooves $e^2$ and turn the toggles into the radial position against the pressure due to the central clock spring H. The inner ends of the toggles are recessed to form the wedge $e^3$ the nose of which meets the spring H, which spring is held between the two ends $e^4$ of the toggle, as shown in Figure 1.

If the worm wheel B and its dogs D turn in the direction indicated by the arrow in Figure 2 with the toggles tilted in the direction shown in that Figure, the initial movement brings the edges of the four dogs up against the sides of the lugs $f$, carrying forward the clutch ring F. On this movement continuing, the small balls L roll against the inner face of the casing $c$ and therefore ride up the sloping groove $e^2$ of the toggles until they pass the central line of the toggles which are then turned into a radial position, pressing the wedge shaped nose of each toggle against the spring H. The depth of the grooves $e^2$ is such that the balls become free in their recesses $f'$ as soon as the toggles reach the radial position and the spring H acting through the toggles and the lugs $f$ drives the divided or expanding clutch ring F against the inner face of the casing $c$, which is therefore frictionally clutched to the dogs D and to the driving worm wheel B.

The reversal of the clutch is effected by displacing the inner ends of the toggles E to the other side of their radial position. For this purpose the sleeve of the frame G has mounted upon it a disc M lying against the face of the worm wheel B, which disc is provided at one side with a fork $m$ engaging an inwardly projecting tooth or pin $j'$ upon the reversing lever J. The pin $j'$ also extends into a groove $b'$ in the face of the wheel B, the inner side of which groove is in the form of two depressions $b^2$ separated by a shoulder. The tooth or pin $j'$ is held in one or the other of the depressions $b^2$ by the aid of the spring $j^2$ bearing against the sliding pivot $j$ of the reversing annular lever J and supported on the radial pin $g'$ on the sleeve $g$.

The annular reversing lever J is formed with the semi-circular rib or flange $j^3$, as shown in Figure 3, against one end of which rib is supported the large ball N, the ball lying free against the end of the rib as the space between the lever J and the inside of the casing at this side is a little greater than the diameter of the ball when the lever is tilted towards the opposite side. The ball N is held between the face of the worm wheel B and the loose retaining ring $n$ shown in Figure 1.

On reversing the drive the parts carried by the worm wheel are all rotated in the opposite direction, with the result that the ball N is allowed to roll back and enter the gradually decreasing channel between the lever J and the casing. The first action is to move the sliding pivot $j$ inwardly so that when the ball reaches the pivot the tooth $j'$ is moved out of the depression $b^2$ in which it has been lying and the lever J is therefore free to turn around its pivot and the further movement of the ball N causes the lever J to turn until the tooth $j'$ occupies the other end of the groove $b'$, reversing the eccentricity of the lever. The ball N is then free to drop on to the other extremity of the rib $j^3$ and the tooth $j'$ can spring into the second depression $b^2$ by the pressure of the spring $j^2$ at the opposite side of the lever.

The displacement of the lever J acting through the tooth $j'$ and the fork $m$ on the disc M causes a displacement of the frame G through an angle corresponding to the movement of the lever J and therefore carries round the pins $e'$ of the toggles E so that the latter lie on the other side of the radial lines through their pivots and the direction of action of the small balls L is consequently reversed with the result that the drive causes the balls again to ride up the sloping grooves $e^2$ and bring the toggles into radial position, in which they force the expanding or divided ring F into engagement with the axle casing $c$.

The clutch is immediately freed on any tendency of the driven shaft C to overrun as the casing $c$ carries forward with it the engaged clutch ring F so as to move the lugs $f$ away from the following dogs D and carry forward the outer ends of the toggles E which are therefore displaced from their substantially radial clutching position. As soon as the toggles turn through a small angle their outward pressure on the clutch ring F ceases and the clutch is free, re-engaging at once, in the manner already described, when the speed of the driven shaft C falls below that of the drive.

It is to be understood that the clutch mechanism shown on the left hand side of Figure 1 is repeated at the other side of the worm wheel so that in the case of a motor vehicle the live axle at each side is driven, the double clutch providing a differential action as well as a drive in either direction.

What I claim and desire to secure by Letters Patent of the United States is:—

1. In a reversible driving clutch, an expanding clutch device, a set of substantially radial spring pressed toggle members adapted to take up either one of two positions on either side of the radial position, in both of which positions they bring the clutch into operation, each toggle member acting on the said clutch device by direct radial spring pressure, and means for automatically displacing the toggle members from one operative position to the other operative position upon reversal of the drive.

2. In a reversible driving clutch, a casing, an expansible divided clutch ring adapted to meet the said casing, a set of spring pressed toggle members carried by the said ring, toggle actuating balls between the casing and the toggles, adapted on taking up the drive in either direction to ride up a surface portion of the toggles and to turn the latter into clutching position against the spring pressure, which pressure causes the toggles to expand the clutch ring, for the purpose specified.

3. In a reversible driving clutch, an expansible divided clutch ring, a set of toggle members carried by the said ring, each member of which set is adapted to take up either one of two driving positions, a radially acting spring effecting the clutching action through the toggle members, and means by which the toggles may be displaced angularly to one or other side of their central position on the direction of the drive being reversed, for the purpose specified.

4. In a reversible driving clutch, an expansible divided clutch ring, a set of toggle members pivoted at their outer ends upon the said clutch ring, and adapted when in substantially radial position to expand the ring into the clutching position, an angularly adjustable frame to which the inner ends of the toggles are connected, and a connection between the frame and the driving mechanism by which on reversal of the drive the frame turns to displace the toggles angularly to the position required for driving in the opposite direction.

5. In a reversible driving clutch, an expansible divided clutch ring, a set of toggle members pivoted at their outer ends upon the said clutch ring, and adapted when in substantially radial position to expand the ring into the clutching position, an angularly adjustable frame to which the inner ends of the toggles are connected, an eccentrically pivoted reversing lever connected to the said frame, an outer stationary frame and a ball lying in the channel between the frame and eccentrically pivoted lever, which ball is adapted on reversal of the drive to travel around the annular lever and displace it around its pivot from one side to the other of its central position, for the purpose specified.

6. In a reversible driving clutch, an expansible divided clutch ring, a set of toggle members pivoted at their outer ends upon the said clutch ring and adapted when in substantially radial position to expand the ring into the clutching position, an angularly adjustable frame to which the inner ends of the toggles are connected, an annular reversing lever connected to the said frame, a sliding spring controlled pivot at one side of the reversing lever, a pin at the other side of the said lever, a driving member provided with a retaining channel having two depressions, in either of which, the said pin is adapted to lie, and rolling means by which the annular lever is on reversal of the drive displaced around its pivot from one side to the other of its central position, for the purpose specified.

7. In a reversible driving clutch, a clutch operating set of toggle members, a single concentric annular spring adapted to act outwardly upon the complete set of toggles, and means for turning the said toggle members into clutching position, in which position they are under the pressure of the said spring.

8. In a reversible driving clutch, a clutch casing, an expansible divided clutch ring provided with lugs, a set of toggle members pivotally connected to the said divided ring, and adapted to expand it against the casing, a driving member provided with dogs adapted to meet either side of the said clutch ring lugs according to the direction of the drive, and means whereby the said toggle members may be moved into clutch ring expanding position for either direction of drive.

LANCELOT ELDIN DE MOLE.